(12) United States Patent
Bellerive et al.

(10) Patent No.: US 10,923,749 B2
(45) Date of Patent: Feb. 16, 2021

(54) METHOD FOR OPERATING A FUEL CELL AND FUEL CELL SYSTEM

(71) Applicants: AUDI AG, Ingolstadt (DE); Volkswagen AG, Wolfsburg (DE)

(72) Inventors: Julie Bellerive, Burnaby (CA); Tommy Cheng, Burnaby (CA); Andrew Desouza, Burnaby (CA)

(73) Assignees: VOLKSWAGEN AG, Wolfsburg (DE); AUDI AG, Ingolstadt (DE)

( * ) Notice: Subject to any disclaimer, the term of this patent is extended or adjusted under 35 U.S.C. 154(b) by 244 days.

(21) Appl. No.: 16/110,856

(22) Filed: Aug. 23, 2018

(65) Prior Publication Data

US 2019/0074532 A1 Mar. 7, 2019

(30) Foreign Application Priority Data

Sep. 5, 2017 (DE) .................. 10 2017 215 574

(51) Int. Cl.
| | |
|---|---|
| *H01M 8/04* | (2016.01) |
| *H01M 8/04828* | (2016.01) |
| *H01M 8/04858* | (2016.01) |
| *H01M 8/04119* | (2016.01) |
| *H01M 8/04492* | (2016.01) |
| *H01M 8/04111* | (2016.01) |
| *H01M 8/04537* | (2016.01) |
| *H01M 8/04746* | (2016.01) |

(52) U.S. Cl.
CPC ..... *H01M 8/04835* (2013.01); *H01M 8/0488* (2013.01); *H01M 8/04111* (2013.01); *H01M 8/04119* (2013.01); *H01M 8/04126* (2013.01); *H01M 8/04507* (2013.01); *H01M 8/04552* (2013.01); *H01M 8/04753* (2013.01); *H01M 8/04761* (2013.01); *H01M 8/04865* (2013.01); *H01M 2250/20* (2013.01)

(58) Field of Classification Search
CPC .................................................. H01M 8/04835
USPC .......................................................... 429/413
See application file for complete search history.

(56) References Cited

U.S. PATENT DOCUMENTS

2015/0155573 A1* 6/2015 Jo .................... H01M 8/04029
429/413

FOREIGN PATENT DOCUMENTS

| DE | 102 46 168 A1 | 4/2004 |
|---|---|---|
| DE | 11 2011 100 046 T5 | 11/2012 |
| DE | 10 2013 112 535 A1 | 6/2016 |
| DE | 10 2015 221 840 A1 | 10/2016 |
| WO | 2006/069070 A2 | 6/2006 |

* cited by examiner

*Primary Examiner* — James M Erwin
(74) *Attorney, Agent, or Firm* — Seed Intellectual Property Law Group LLP

(57) ABSTRACT

The disclosure relates to a method for operating a fuel cell that comprises at least one individual cell with a membrane and catalysts, wherein humidity within the fuel cell is actively influenced as a function of a voltage of the fuel cell, and the method further includes specifying an initial humidity at an initial operating-point-related voltage, and specifying a second humidity that is lower than the first humidity at a second operating-point-related voltage that is higher than the first operating-point-related voltage. Furthermore, the disclosure relates to a fuel cell system that is configured to perform the method according to the disclosure.

17 Claims, 3 Drawing Sheets

METHOD FOR OPERATING A FUEL CELL AND FUEL CELL SYSTEM

BACKGROUND

Technical Field

The disclosure relates to a method for operating a fuel cell and a fuel cell system that is configured to perform the method.

Description of the Related Art

Fuel cells use the chemical conversion of a fuel with oxygen into water in order to generate electrical energy. For this purpose, fuel cells contain the so-called membrane electrode assembly (MEA) as a core component, which is an arrangement of an ion-conducting (often proton-conducting) membrane and of a catalytic electrode (anode and cathode), respectively arranged on both sides of the membrane. The latter generally comprise supported precious metals, in particular platinum. In addition, gas diffusion layers (GDL) can be arranged on both sides of the membrane electrode assembly, on the sides of the electrodes facing away from the membrane. Usually, the fuel cell is formed by a plurality of MEAs arranged in a stack (fuel cell stack) whose electrical power outputs accumulate. Between the individual membrane electrode assemblies, bipolar plates (also called flow field plates or separator plates) are usually arranged, which ensure a supply of the individual cells with the operating media, i.e., the reactants, and are usually also used for cooling. In addition, the bipolar plates also ensure an electrically conductive contact to the membrane electrode assemblies.

While the fuel cell is operating, the fuel (anode operating medium), in particular hydrogen $H_2$ or a hydrogen-containing gas mixture, is supplied to the anode via an anode-side open flow field of the bipolar plate where electrochemical oxidation of $H_2$ into protons $H^+$ occurs with the release of electrons ($H_2 \rightarrow 2\ H^+ + 2e^-$). Protons are transported (water-bound or water-free) from the anode chamber into the cathode chamber across the electrolyte or membrane that separates and electrically insulates the reaction chambers gas tight from each other. The electrons provided at the anode are guided to the cathode via an electrical line. Oxygen or an oxygen-containing gas mixture (such as air) as the cathode operating medium is supplied to the cathode via a cathode-side open flow field of the bipolar plate so that a reduction of $O_2$ to $O^{2-}$ occurs with the accretion of electrons ($\frac{1}{2}O_2 + 2e^- \rightarrow O^{2-}$). At the same time, in the cathode chamber the oxygen anions react with the protons transported across the membrane with the formation of water ($O^{2-} + 2H^+ \rightarrow H_2O$).

So-called degradation of the fuel cell, frequently also termed voltage or performance degradation, describes phenomena that attenuate the voltage or performance of the fuel cell over its life. The degradation of a cathode-side catalyst is the primary cause of the loss of performance over the life of the fuel cell. One of the known effects originates in a corrosion of the catalysts and/or a substrate of the catalysts. Another negative effect for the fuel cell furthermore originates in a growth of catalyst particles that cause a loss of specific catalyst surface.

A known solution to the problem is to increase a catalyst load, i.e., additionally available catalyst material which, however, results in making the fuel cell more expensive. Another option is to minimize a maximum voltage during fuel cell idling which is not however always possible during operation in a vehicle. Furthermore, so-called air-air starts, in which there is air at the anode side as well as the cathode side before starting the fuel cell, can be minimized. However, expensive valves and complicated starting sequences (starting strategies) are needed for this.

BRIEF SUMMARY

The object of the disclosure is to propose a method for operating a fuel cell system that yields improved fuel cell durability.

This object is achieved by a method for operating a fuel cell that comprises at least one individual cell with a membrane and catalysts, wherein humidity within the fuel cell is actively influenced as a function of a voltage of the fuel cell, and the method furthermore comprises:

specifying an initial humidity at an initial operating-point-related voltage, and specifying a second humidity that is lower than the first humidity at a second operating-point-related voltage that is higher than the first operating-point-related voltage.

By means of the disclosure, performance degradation, in particular of a cathode-side catalyst, is reduced.

Relatively high voltages (such as at least 800 mV per individual cell), i.e., at a relatively low current density, during the operation of the fuel cell result in a relatively high degradation rate due to catalyst degradation (in particular of platinum (Pt)), a loss of catalyst surface, and catalyst particle growth. However, it has been found that the catalyst degradation rate is lower in environments with relatively low humidity since less water is available for degradation. It is therefore advantageous to provide a relatively low humidity (i.e., drier operation) at relatively high voltages in order to reduce the degradation rate. However, the relatively low humidity causes the water content of the membrane of the fuel cell to be low, which significantly increases an ohmic loss. In order to achieve high performance, it is therefore desirable to operate the fuel cell at relatively low voltages, i.e., when fuel cell current density is high. The first and the second operating-point-related voltages can be considered different-level voltage values (that are measured at the same location).

Actively influencing means in particular that operating parameters are purposefully specified for the fuel cell, in particular a fuel cell system that comprises the fuel cell, in order to achieve, if possible, the desired first and second humidities at the operating-point-related first and second voltages. This therefore constitutes in particular a regulation of a humidity (or humidity level) of the fuel cell. However, the first and second humidities may not be reached in practice since for example parameters of the ambient air or technical limits of the fuel cell system do not permit this. In particular, the first and second humidities represent humidity values (at the same location).

The first and second humidities can in particular be understood as a first and a second target humidity for the humidity within the fuel cell. They should be achieved if possible. The humidity within the fuel cell can be understood as an actual humidity. The (actual) humidity is then influenced depending on the (specified) first humidity and the second (target) humidity. For this, the method comprises in particular a step of actively influencing the (actual) humidity so that the (actual) humidity approaches the first or second (target) humidity (in particular, is raised or lowered). The first and second target humidities can be predetermined beforehand by experiments.

The humidities within the fuel cell can be humidities within an anode chamber, or preferably a cathode chamber of the fuel cell. The humidities are furthermore preferably humidities adjacent to the membrane and/or at least one of the catalysts, in particular adjacent to a cathode-side catalyst. Preferably, the humidities designate relative humidities of an anode gas or preferably a cathode gas. The first and second humidities do not have to represent constant humidity values; they can each vary (such as within a bandwidth).

The fuel cell comprises at least one individual cell, wherein the operating-point-related voltage can be the voltage of an individual cell (individual cell voltage), or the voltage of the fuel cell, such as a fuel cell stack voltage. That the first and second voltages are operating-point-related voltages means that the first and second voltages are contingent upon an (in particular current and/or future) operating point. The second voltage is therefore not lower than the first voltage due to degradation, i.e., not due to a degradation of the fuel cell, but rather due to an operating point set or to be set.

Preferably, the first humidity is a relative humidity that is between 91% and 100%, preferably between 96% and 100%, in particular 100%. Because of this relatively high relative humidity, the fuel cell can be operated with a particularly high membrane proton conductivity and hence with particularly high current densities.

According to a preferred embodiment of the disclosure, the second humidity is a relative humidity that is at most 90%, preferably at most 85%, in particular at most 80%. Due to this relatively low relative humidity, a particularly low catalyst degradation rate is achieved.

Preferably, the first operating-point-related voltage corresponds at most to a first threshold voltage, wherein the first threshold voltage is between 700 mV and 850 mV, in particular between 750 mV and 800 mV per individual cell of the fuel cell. The first operating-point-related voltage is accordingly less than or equal to the first threshold voltage that lies within the aforementioned voltage ranges. Below or at the threshold voltage, a relatively high first humidity is particularly desirable (with respect to the second humidity). The first threshold voltage can also be termed the bottom threshold voltage.

Preferably, the second operating-point-related voltage is greater than a second threshold voltage, wherein the second threshold voltage is between 700 mV and 850 mV, in particular between 750 mV and 800 mV per individual cell. The second operating-point-related voltage is accordingly greater than the second threshold voltage that lies within the aforementioned voltage ranges. Above the threshold voltage, a relatively low second humidity is particularly desirable (with respect to the first humidity). The second threshold voltage can also be termed the top threshold voltage.

Since the first operating-point-related voltage is less than the second operating-point-related voltage, the first threshold voltage in particular at most corresponds to the second threshold voltage. The first threshold voltage is therefore less than or equal to the second threshold voltage.

Preferably, the humidity of the fuel cell is actively influenced by setting an (in particular relative) humidity upstream from or at an inlet to the fuel cell. The relative humidity upstream from or at an inlet can therefore be considered a control variable for changing the actual humidity within the fuel cell in the direction of the first and/or second humidity (the target humidity). This can be accomplished by means of a humidity exchanger arranged upstream from the fuel cell on the cathode side. The humidity of the fuel cell can therefore be influenced directly.

Preferably, the humidity of the fuel cell is actively influenced by setting a flow and/or a pressure of the fuel cell. In particular, the flow is adjusted on the cathode side. The flow can be a flow upstream from, and/or at, an inlet to the fuel cell. The flow is in particular specified by means of a compressor arranged on the cathode side upstream from the fuel cell. Accordingly, the humidity of the fuel cell can be influenced by supplying ambient air into the fuel cell. The pressure is in particular a cathode-side pressure of the fuel cell, wherein an anode-side pressure can however also be correspondingly set. The pressure can be set by means of an installed flow control valve downstream from, and a compressor upstream from, the fuel cell. The flow and/or pressure can also be considered a control variable for changing the actual humidity within the fuel cell in the direction of the first and/or second humidities (the target humidity).

It is also preferable for the humidity to be specified by adjusting a temperature of the fuel cell. The temperature is in particular a temperature upstream from or at an inlet of the fuel cell.

Preferably, the humidity is set in that the first and second humidities lie within predetermined operating conditions of the membrane, and/or at least one of the catalysts. A long life and performance of the membrane is accordingly ensured.

Moreover, a fuel cell system is provided that is configured to perform the method according to the disclosure. For this, the fuel cell system has means for performing the method. The life of the fuel cell system is also extended by the method according to the disclosure. Moreover, costs are saved due to the lower catalyst load required.

Furthermore, a vehicle is provided comprising the fuel cell system according to the disclosure. Preferably, the vehicle is a fuel cell vehicle. It typically has the fuel cell for providing electrical energy for an (electric) drive motor of the vehicle. A particularly durable and simultaneously economical vehicle is created by disclosure.

Additional preferred embodiments of the disclosure arise from the remaining features mentioned in the dependent claims.

The various embodiments of the disclosure mentioned in this application may be combined advantageously with one another unless stated otherwise in individual cases.

BRIEF DESCRIPTION OF THE SEVERAL VIEWS OF THE DRAWINGS

The disclosure is explained below in exemplary embodiments in reference to the respective drawings. The following is shown.

DETAILED DESCRIPTION

Figure 1:
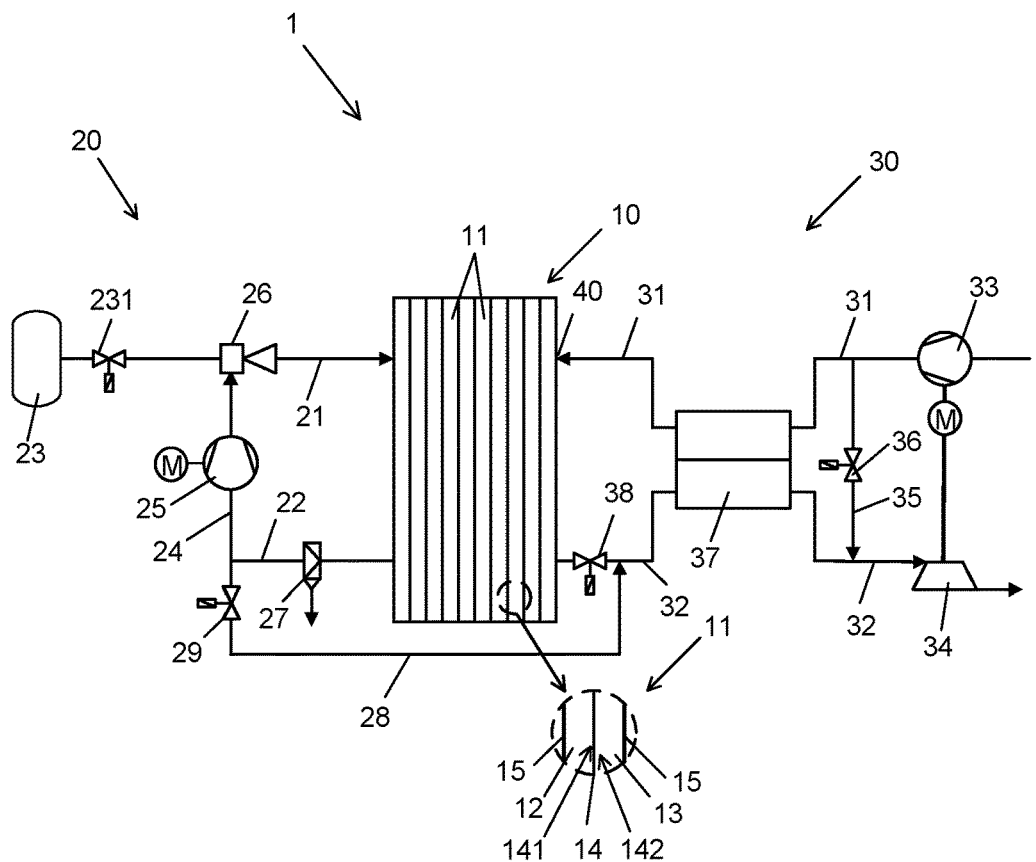
FIG. 1 illustrates a fuel cell system according to a preferred embodiment of the disclosure.

FIG. 1 shows a fuel cell system 1 according to a preferred embodiment of the present disclosure that is configured to perform the method 100 according to the disclosure. The fuel cell system 1 is part of a vehicle (not shown), in particular an electric vehicle that has an electric traction motor which is supplied with electrical energy by the fuel cell system 1.

The fuel cell system 1 comprises, as a core component, a fuel cell stack 10 which has a plurality of stacked individual cells 11 formed by alternately stacked membrane electrode assemblies (MEA) and bipolar plates 15. Each individual cell 11 accordingly comprises one MEA that has an ion-conductive membrane 14, a polymer electrolyte membrane or another solid electrolyte as well as catalytic electrodes (catalysts) arranged on both sides, i.e., an anode-side catalyst 141 and cathode-side catalyst that catalyzes the respective partial reaction of the fuel cell conversion (fuel cell reaction) and in particular can take the form of coatings on the membrane 14. The catalysts 141, 142 have a catalytic material such as platinum that is supported on an electrically-conductive substrate material with a large specific surface such as a carbon-based material. An anode space 12 is thus formed between a bipolar plate 15 and the anode, and the cathode space 13 between the cathode and the next bipolar plate 15. The bipolar plates 15 serve to supply the operating media into the anode and cathode chambers 12, 13 and also establish the electrical connection between the individual fuel cells 11. Optionally, gas diffusion layers can be arranged between the membrane electrode assemblies 14 of the bipolar plates 15.

In order to supply the fuel cell stack 10 with operating media, the fuel cell system 1 has, on the one hand, an anode system 20 and, on the other hand, a cathode system 30.

Accordingly, the anode system 20 has an anode supply path 21 that leads to the fuel cell stack 10, and an anode exhaust gas path 22 that leads out of the fuel cell stack 10. The paths 21 and 22 are connected to a recirculation line 24 in which a delivery device 25 is provided for enabling recirculation of an anode gas. This is recommendable since not all of the anode gas introduced by a pressure tank 23 via a pressure control valve 231 is consumed by the fuel cell stack 10 while flowing through the fuel cell stack 10.

The anode system 20 furthermore comprises a water separator 27 in which water that is in the anode gas collects and is drained as needed. Moreover, the anode system 20 comprises a flushing line 28 that as needed establishes a connection between the anode system 20 and the cathode system 30 via a flushing valve 29. This may be necessary for example when the nitrogen concentration in the anode gas which builds up over the time of operation is too high.

The cathode system 30 can be divided into a cathode supply path 31 and a cathode exhaust gas path 32. The cathode supply path 31 comprises a compressor 33 for delivering ambient air into the fuel cell stack 10. The cathode exhaust gas path 32 in contrast comprises a turbine 34 that draws energy from the cathode gas and mechanically supplies it to the compressor 33. Moreover, the cathode supply path 31 can be connected to the cathode exhaust gas path 32 by means of a wastegate line 35 in order to not conduct the ambient air through the fuel cell stack 10 in certain operating states, even though the compressor 33 is operating. To influence the flow through the wastegate line 35, the wastegate line 35 has actuating means 36 such as a valve or a butterfly valve.

Furthermore, the cathode supply path 31 and the cathode exhaust gas path 32 are connected by means of a humidifier 37. This is accomplished by conducting humidity of a cathode exhaust gas from the cathode exhaust gas path 32 into the cathode supply path 31 where the humidity moistens the ambient air supplied to the fuel cell 10. This is necessary because the membranes of the membrane electrode assemblies 14 are not allowed to dry out.

The cathode exhaust gas path 32 moreover comprises a pressure setting valve 38 that serves to set a cathode-side pressure within the fuel cell stack 10.

According to the present application, the fuel cell 10 can only comprise a single individual cell 11 or a plurality of individual cells 11 in the sense of a fuel cell stack 10.

Figure 2:
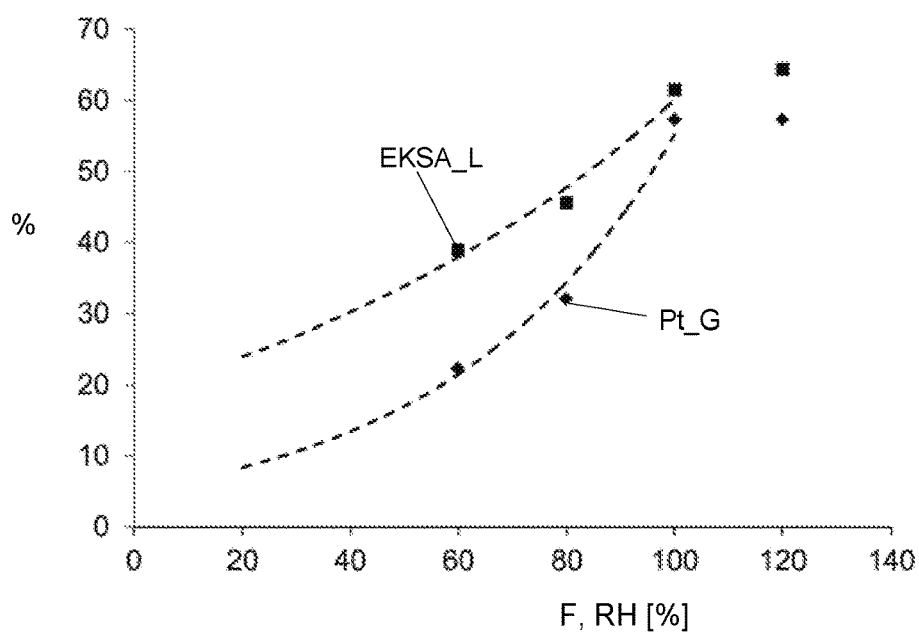
FIG. 2 illustrates a degradation rate depending on the humidity.

FIG. 2 shows a degradation rate as a function of the humidity F. The moisture F is represented here as a relative humidity RH in percent. The humidity is hence in particular the relative humidity in one of the catalysts 141, 142. A platinum particle growth Pt_G and an electrochemical surface area loss EKSA_L are represented. It can be seen that the degradation strongly depends on the humidity in the catalysts. As the relative humidity increases, the degradation accordingly rises strongly. Even in the presence of liquid water, i.e., at a relative humidity of more than 100%, the degradation remains constantly high or even increases slightly.

Figure 3:
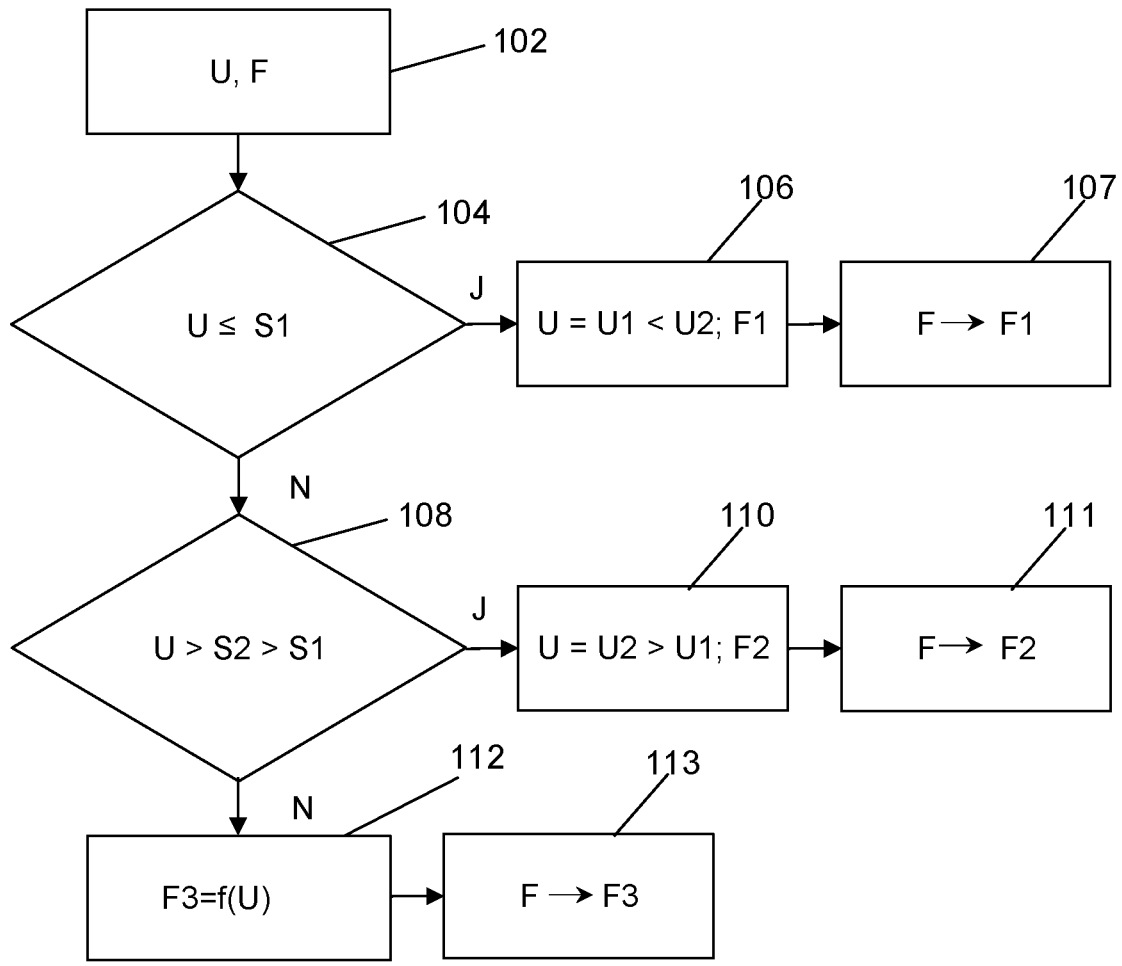
FIG. 3 illustrates a method according to a preferred embodiment of the disclosure.

FIG. 3 shows a method according to a preferred embodiment of the disclosure.

According to the method 100, the humidity F is actively influenced within the fuel cell 10 as a function of the voltage U of the fuel cell 10. This is accomplished in that a first humidity F1 is specified at a first voltage U1 that is a relatively low voltage U due to the operating point, which is a relatively high humidity F. At a second voltage U2 which is a relatively high voltage U due to the operating point, a relatively low humidity is specified. Thereby not only is a performance-enhancing relatively high humidity F achieved at low voltages U (high currents), but also a life-increasing relatively low humidity F is achieved at high voltages U (low current).

Firstly a momentary voltage U is determined in a first step 102. In addition, a momentary humidity F is determined. The humidity F represents an actual humidity F. The humidity F can be a relative percentual humidity RH within the fuel cell 10. The humidity F can be measured or modeled by means of a calculation model. The voltage U can be a voltage of the fuel cell stack 10 (a measured value) or of the individual cell 11 in the following example. The voltage of the individual cell 11 is typically calculated from the voltage of the fuel cell stack 10 but can, however, also be measured directly.

In a comparison 104, it is determined whether the voltage U corresponds at most to a first (bottom) voltage threshold S1. If this is the case, the first, relatively high humidity F1, which for example is between 91% to 100%, is specified in a first step 106 for the humidity F within the fuel cell 10. The first humidity F1 can hence be termed a first target humidity F1.

Then in step 107, the humidity F is influenced in the direction of the first humidity F1.

If the comparison 104 is negative, it is determined in a comparison 108 whether the voltage U is greater than a second threshold voltage S1. If this is the case, the second, relatively low humidity F2 is specified in a step 110 for the humidity F within the fuel cell 10. The second humidity F2 can for example be at most 90%. Furthermore, the second humidity F2 can be termed a second target humidity F2.

Subsequently in step 111, the humidity F is influenced in the direction of the first humidity F1.

The first and second threshold voltages S1 and S2 can lie within a range between 700 mV and 850 mV, wherein the two threshold voltages S1 and S2 can in principle also be of the same magnitude. In the present example, the second threshold voltage S2 is however higher than the first threshold voltage S1.

If the comparison 108 is also negative, this means that the momentary voltage U lies between the two threshold voltages S1 and S2. In this case, a third humidity F3 can be specified for the humidity F that is a function f of the voltage U and can be designated the third target humidity F3. For example, the function f can be defined such that the third humidity F3 corresponds to the humidity F1 at a voltage U that corresponds to the first threshold voltage S1. At a voltage U that corresponds to the second threshold voltage S1, the third humidity F3 corresponds to the humidity F2 which is lower than the humidity F1. The humidities F1 and F2 can represent the extreme values of the function f. Between the two humidities F1 and F2, the function f can be defined such that for example it has a linear characteristic.

Then in step 113, the humidity F is influenced in the direction of the first humidity F1.

The actual humidity F within the fuel cell 10 according to the voltage U depending on the respective target humidities F1, F2 and F3 is actively influenced by influencing at least one operating parameter of the fuel cell system 1.

The humidity F can be influenced by setting a relative humidity upstream from or at an inlet 40 to the cathode supply path 31 of the fuel cell 10. The humidifier 37 can be used for this.

Furthermore, the humidity F can be influenced by setting a flow in the fuel cell 10. For this purpose, the compressor 33 can be operated at a desired rotational speed. In addition or alternatively, the humidity F can be influenced by setting a pressure in the fuel cell 10. For this purpose, the pressure setting valve 38 in the cathode exhaust gas path 32 can be used. The pressure and the flow can also be set at the inlet 40 of the fuel cell stack 10 in order to reach the desired relatively high humidity F in the cathode-side catalyst when the voltage U lies below about 800 mV per individual cell in order to achieve the desired proton conductivity. The relative humidity RH at the inlet as well as the pressure and flow can also be used to reach the desired relatively low humidity F at voltages U above 800 mV per individual cell so that the platinum degradation rate and hence the performance degradation are reduced over the operating time by the low humidity F at the cathode. In principle, all operating parameters of the fuel cell system 1 that influence the humidity F at the cathode-side catalyst 141 can be used to reach the goal of reduced degradation.

The aforementioned operating states at the inlet 40 are specified so that the humidity F at the membrane 14 lies within the predetermined, permissible operating conditions of the membrane 14, which in particular is a membrane coated with the catalysts 141, 142 (catalyst-coated membrane, CCM). The operating states at the inlet 40 can be calculated by a single-cell moisturizing model that is coupled to a (gas-to-gas) humidifier model (of the humidifier 37).

Figure 4:
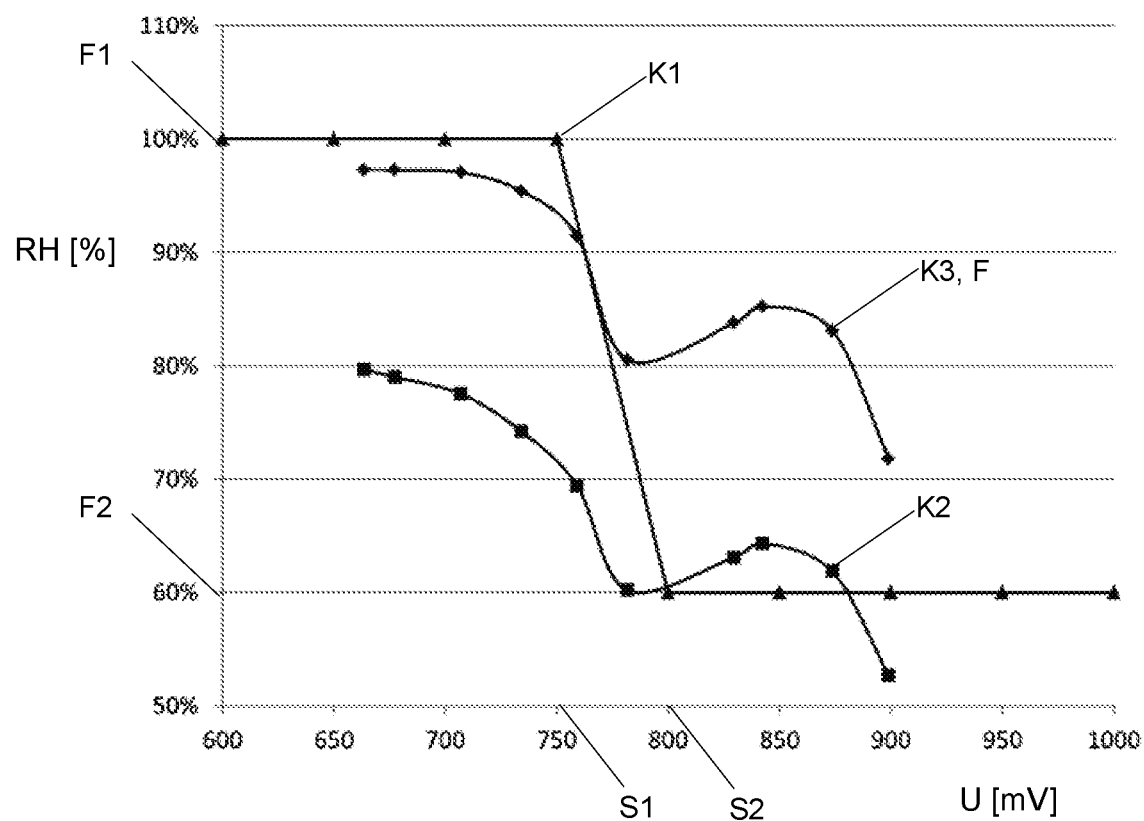
FIG. 4 illustrates an operating strategy according to a preferred embodiment of the disclosure.

FIG. 4 portrays an operating strategy according to a preferred embodiment of the disclosure in a diagram in which a relative humidity RH is plotted as a percentage against the operation-related single-cell voltage (operating cell voltage) in millivolts (mV).

The curve K1 represents an example of a target humidity to be reached for the humidity F as a relative humidity RH at a cathode-side catalyst. The curve K1 represents an ideal case that is only achievable to a limited extent in practice due to the limitations of the fuel cell system 1 and/or the ambient parameters such as the relative humidity in the ambient air. Once a voltage U is greater than the second threshold voltage S2 of 800 mV, it is envisaged to specify a relative humidity RH at the catalyst of 60%. With voltages U that are less than or equal to 800 mV, the relative humidity RH should be higher. The curve K1 can be configured so that the humidity F amounting to 100% relative humidity Rh and the cathode gas is only specified below the first threshold voltage S1. A linear characteristic of the humidity F between the threshold voltages S1 and S2 is desirable. Overall, a high first humidity F1 is set as a goal given relatively low voltages U, i.e., relatively high current densities, whereas the humidity F should decrease according to the function of the third humidity F3 (between F1 and F2 in FIG. 4) when the voltage values for the voltage U are between about 750 and 800 mV per individual cell 11 in order to specify a relatively low second humidity F2 at relatively high voltages U.

Curve K2 shows an actual relative humidity RH at the inlet 40 of the fuel cell stack 10 that was set in order to influence the humidity F at the cathode and also achieve, if possible, the curve K1 in reality in this context. Here, the curve K2 represents the value of the humidity F at the inlet 40 which is achievable due to the limitations of the fuel cell system 1 and/or the parameters of the ambient air.

Curve K3 shows a modeled, average relative humidity RH within a cathode channel at a cathode-side catalyst. The curve K3 therefore approximately corresponds to the actual humidity F. The curve K3 results from the relative humidity specified at the inlet 40 as can be seen in curve K2. It is apparent that the curve K3 substantially corresponds to a curve K2 shifted to higher relative humidities. This is because product water accumulates within the fuel cell 10 which increases the relative humidity RH of the cathode gas. It also can be seen that the curve K3 at voltages U above the second threshold voltage S2 significantly deviates from the second specified humidity F2. This (undesired) deviation of the actual humidity F from the target humidity F2 can eventuate because the actual humidity F cannot be lowered any further due to excessive humidity in the ambient air.

The method 100 creates a solution for limiting the degradation by controlling or regulating the humidity F within the fuel cell 10. Moreover, a cathode-side catalyst load can be saved, whereas at the same time the negative effects of performance degradation are reduced.

In addition, the solutions of the exemplary embodiments can be combined with each other.

LIST OF REFERENCE SYMBOLS

1 Fuel cell system
10 Fuel cell stack/fuel cell
11 Individual cell
12 Anode chamber
13 Cathode chamber
14 Membrane
141 Anode-side catalyst
142 Cathode-side catalyst
15 Bipolar plate (separator plate, flow field plate)
20 Anode system
21 Anode supply path
22 Anode exhaust path
23 Pressure tank
231 Pressure control valve
24 Recirculation line
25 Delivery device/turbomachine
27 Water separator
28 Flushing line 29 Flushing valve
30 Cathode system
31 Cathode supply path
32 Cathode exhaust path
33 Compressor
34 Turbine
35 Wastegate line
36 Actuating means
37 Humidifier
38 Pressure-setting valve
40 Inlet
100 Method
102 Provision of a momentary voltage
104 Comparison of the voltage with a first threshold voltage
106 Specification of a first humidity
107 Influencing the humidity toward the first humidity
108 Comparison of the voltage with a second threshold voltage
110 Specification of a second humidity
111 Influencing the humidity toward the second humidity
112 Specification of a third humidity as a function of the voltage.
113 Influencing the humidity toward the third humidity
Pt_G Platinum particle growth
EKSA_L Electrochemical surface loss
U Voltage
U1 First voltage
U2 Second voltage
F (Actual) humidity
F1 First (target) humidity
F2 Second (target) humidity
F3 Third (target) humidity
RH Relative humidity
f Function
S1 First threshold voltage
S2 Second threshold voltage

The invention claimed is:

1. A method for operating a fuel cell including at least one individual fuel cell with a membrane and catalysts, the method comprising:
   actively influencing a humidity within the fuel cell as a function of a voltage of the fuel cell, the influencing comprising:
   specifying a first humidity at a first operating-point-related voltage, wherein the first humidity is a relative humidity of 100%; and
   specifying a second humidity that is lower than the first humidity at a second operating-point-related voltage that is higher than the first operating-point-related voltage.

2. The method according to claim 1, wherein the second humidity is a relative humidity that is at most 90%.

3. The method according to claim 1, wherein the first operating-point-related voltage corresponds at most to a first threshold voltage, and wherein the first threshold voltage is between 700 mV and 850 mV per individual fuel cell.

4. The method according to claim 1 wherein the second operating-point-related voltage is greater than a second threshold voltage, and wherein the second threshold voltage is between 700 mV and 850 mV per individual fuel cell.

5. The method according to claim 1 comprising actively influencing the humidity within the fuel cell by setting a humidity upstream from or at an inlet to the fuel cell.

6. The method according to claim 1 comprising actively influencing the humidity within the fuel cell by setting a flow and/or pressure of the fuel cell.

7. The method according to claim 1 comprising setting the first and second humidities to lie within predetermined operating conditions of at least one of the membrane or at least one of the catalysts.

8. The method according to claim 1 comprising actively influencing the humidity within the fuel cell adjacent to at least one of the membrane or at least one of the catalysts of the fuel cell.

9. A fuel cell system, comprising:
   at least one individual fuel cell;
   a membrane of the at least one individual fuel cell;
   catalysts of the at least one individual fuel cell, the fuel cell system configured to actively influence a humidity within the fuel cell as a function of a voltage of the fuel cell by:
   specifying a first humidity at a first operating-point-related voltage, wherein the first humidity is a relative humidity in a range from 91% to 100%; and
   specifying a second humidity that is lower than the first humidity at a second operating-point-related voltage that is higher than the first operating-point-related voltage.

10. The fuel cell system according to claim 9, wherein the second humidity is a relative humidity that is at most 90%.

11. The fuel cell system according to claim 9, wherein the first operating-point-related voltage corresponds at most to a first threshold voltage, and wherein the first threshold voltage is between 700 mV and 850 mV per individual fuel cell.

12. The fuel cell system according to claim 9, wherein the second operating-point-related voltage is greater than a second threshold voltage, and wherein the second threshold voltage is between 700 mV and 850 mV per individual fuel cell.

13. The fuel cell system according to claim 9, further comprising:
   a compressor configured to influence the humidity of the fuel cell by setting a flow of the fuel cell.

14. The fuel cell system according to claim 9, further comprising:
   a pressure setting valve positioned in a cathode exhaust path of the fuel cell, the pressure setting valve configured to influence the humidity of the fuel cell by setting a pressure of the fuel cell.

15. The method according to claim 1, wherein the second humidity is a relative humidity that is at most 80%.

16. The method according to claim 1, wherein the first operating-point-related voltage corresponds at most to a first threshold voltage, and wherein the first threshold voltage is between 750 mV and 800 mV per individual fuel cell.

17. The method according to claim 1, wherein the second operating-point-related voltage is greater than a second threshold voltage, and wherein the second threshold voltage is between 750 mV and 800 mV per individual fuel cell.

* * * * *